United States Patent
Streuer et al.

(10) Patent No.: US 8,608,005 B2
(45) Date of Patent: Dec. 17, 2013

(54) VALVE PLUG

(75) Inventors: Peter Streuer, Hannover (DE); Karl-Heinz Pietziekates, Wunstorf (DE)

(73) Assignee: Johnson Controls Autobatterie GmbH & Co. KGaA, Hannover (DE)

( * ) Notice: Subject to any disclaimer, the term of this patent is extended or adjusted under 35 U.S.C. 154(b) by 106 days.

(21) Appl. No.: 13/318,034

(22) PCT Filed: Apr. 30, 2010

(86) PCT No.: PCT/DE2010/000497
§ 371 (c)(1), (2), (4) Date: Dec. 6, 2011

(87) PCT Pub. No.: WO2010/124684
PCT Pub. Date: Nov. 4, 2010

(65) Prior Publication Data
US 2012/0085762 A1     Apr. 12, 2012

(30) Foreign Application Priority Data
Apr. 30, 2009   (DE) .................. 10 2009 019 346

(51) Int. Cl.
*B65D 51/18*  (2006.01)
*B65D 41/04*  (2006.01)
*B65D 51/16*  (2006.01)

(52) U.S. Cl.
USPC .................. 220/254.1; 220/288; 220/203.29; 220/601

(58) Field of Classification Search
USPC ......... 220/288, 203.29, 304, 212, 601, 254.1; 215/355, 364
See application file for complete search history.

(56) References Cited

U.S. PATENT DOCUMENTS 5,388,615 A * 2/1995 Edlund et al. ................. 137/859
2007/0166606 A1 7/2007 Brecht et al.

FOREIGN PATENT DOCUMENTS

| DE | 1 196 258 B | 7/1965 |
| DE | 11 96 258 B | 7/1965 |
| DE | 103 49 395 B3 | 1/2005 |
| DE | 103 49 396 B3 | 1/2005 |
| EP | 1 001 905 B1 | 1/2003 |
| EP | 1 194 962 B1 | 3/2005 |
| SU | 1 023 460 A1 | 6/1983 |

OTHER PUBLICATIONS

Int'l Preliminary Report on Patentability, Apr. 30, 2010, VB Autobatterie GmbH.

* cited by examiner

*Primary Examiner* — Steven A. Reynolds
*Assistant Examiner* — Javier A Pagan
(74) *Attorney, Agent, or Firm* — Boardman & Clark LLP

(57) ABSTRACT

The invention relates to a valve plug (1) for sealing a container opening, comprising a valve body (2) that can be placed on the container opening and is made of a first, rigid plastic material and a valve element (3) that is integrally connected to the valve body (2) and made of a second, elastic plastic material, which is more elastic than the first plastic material, wherein the valve element (3) has a sealing surface section (6) that can be placed in a sealing manner on a contact edge and a connecting part (8), which extends from a sealing surface section (6) radially through an opening in the valve body (2) to a retaining section (10) held on the outer circumference of the valve body, wherein the sealing surface section (6) is held by the connecting part without axial support of the sealing surface section (6).

20 Claims, 2 Drawing Sheets

VALVE PLUG

CROSS-REFERENCE TO RELATED APPLICATIONS

Figure 2:
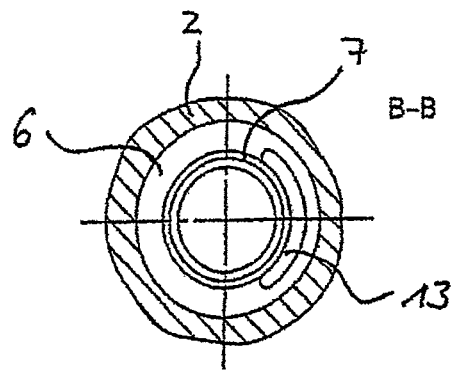

This application claims priority as a National Phase application from International Patent Application Serial No. PCT/DE2010/000497, filed Apr. 30, 2010, entitled VALVE PLUG, which claims priority from German Patent Application Serial Number DE 10 2009 019 346.4, filed Apr. 30, 2009, the contents of each of which is hereby incorporated in its entirety by reference.

The invention relates to a valve plug for sealing off a container opening, having a valve body which can be fitted on the container opening and is composed of a first, rigid plastics material, and having a valve element which is integrally connected to the valve body and is composed of a second, elastic plastics material which is more elastic than the first plastics material, with the valve element having a sealing surface section, which can be fitted on a bearing edge which delimits the container opening, and a connecting part which holds the sealing surface section in the desired position.

Valve plugs of this kind are used, in particular, for closing filling and monitoring openings in rechargeable batteries, in particular in lead-acid batteries for motor vehicles. The valve elements incorporated in the valve plugs are intended to be used to allow gas to be discharged if there is excess pressure in the battery housing.

By way of example, EP 1 194 962 B1 discloses fitting an elastic cap on a pipe connection piece which delimits a container opening in a battery cell. A separate sealing cover which closes the battery cover is fitted above the elastic cap. When there is excess pressure, gas can pass from inside the cell to the outside through the intermediate space between the pipe connection piece and the elastic cap on account of the ability of the elastic cap to undergo elastic deformation.

EP 1 001 905 B1 discloses a sealing valve which is composed of rubber-elastic material and has a plug part which can be inserted into a container opening as far as a plug collar which projects beyond the plug part in the radial direction. At least one control channel is formed on the plug part by a recess in the plug part, said control channel extending from a lower face of the plug part, in the direction of the longitudinal axis of the sealing valve, as far as the plug collar. A sealing bead is integrally formed on the plug collar, it being possible for said sealing bead to be placed in a leak-tight manner on a container edge which surrounds the container opening. In addition, the control channel continues in the plug part as far as the sealing bead.

DE 103 49 395 B3 describes a valve plug in which a valve which is composed of an elastic material is integrally formed on a base body, with the result that the valve and the base body form a multicomponent injection-molded part. The integral elastic valve as a shaped part has a valve body and a sealing tab which is integrally formed on said valve body and has a thinner cross section than the valve body. The sealing tab is integrally formed on the lower outer edge region of the valve body and has the shape of a semicircular disk which bears against the inner edge of a sleeve in the valve body for sealing purposes.

Proceeding from the above, the object of the invention is to provide an improved valve plug for sealing off a container opening with a valve element which responds in a reliable manner at a defined pressure.

The object is achieved by the valve plug as claimed in claim 1.

Advantageously, the sealing surface section is not held by an axial support, as in known valve plugs, but rather significantly by a connecting part which extends through a cutout in the valve body in the radial direction.

A cutout in the sealing surface section has the effect of the resilient region being more flexible in that area than in the rest of the peripheral region of the connecting part which presses the sealing surface section on the bearing edge. This allows for a defined response of the valve function in this region. The defined response is additionally ensured by a sealing lip which reduces the risk of the sealing surface section sticking to the bearing edge of the container opening. The cutout can advantageously be in the form of a slot which is in the form of a segment of a ring.

It is advantageous when the connecting part holds the sealing surface section firmly on the valve body, so that the sealing surface section does not yield elastically or elastically yields only slightly in the region of the connecting part, whereas the desired elasticity of the sealing surface section is ensured by the defined cutout in the sealing surface section, with the shape of the cutout substantially determining the desired response pressure of the valve element.

It is advantageous when the sealing surface section is routed radially outward through an opening in the valve body and is integrally connected to an annular seal which is integrally formed on the outside of the valve body. This provides an integral design of the valve element of the annular seal which is already supported in a stable manner in the valve body on account of its arrangement. In addition, production is simplified by virtue of the reduced number of injection points for the two different material components.

The valve plug is preferably designed for use in a filling and monitoring opening in a rechargeable battery, in particular a lead-acid starter battery and, to this end, has, for example, an external thread, which is arranged at a suitable point, for screwing the valve plug into the filling and monitoring opening, and also one annular seal or two annular seals which are at a distance from and adjacent to one another.

It is advantageous when the sealing surface section has an annular sealing lip which points in the direction of a plug part.

It is advantageous when the height of the sealing lip varies over the periphery of said sealing lip, that is to say has different heights.

It is advantageous when the sealing lip has the greatest height in the region of the cutout.

It is advantageous when the material thickness of the sealing surface section increases, starting from the connecting part, on that side which is averted from the holding section.

It is advantageous when the material thickness of the sealing surface section increases in a linear manner.

A slope is formed by the non-uniform design of the height of the sealing lip or of the material thickness of the sealing surface section. When the sealing surface section is inserted into the valve plug, the slope creates a greater prestress than the plug part which is situated beneath it, the upper face of said plug part which faces the sealing surface section serving as a valve seat. This allows for an improved valve function. This has the effect of closing the valve again in good time before a rechargeable battery is completely degassed. The thickest point of the sealing surface section or of the sealing lip is advantageously situated in the region of the abovementioned slot, which is in the form of a segment of a ring, in the sealing surface section. The non-uniform design of the height of the sealing lip can advantageously be combined with the non-uniform design of the material thickness.

Figure 1:
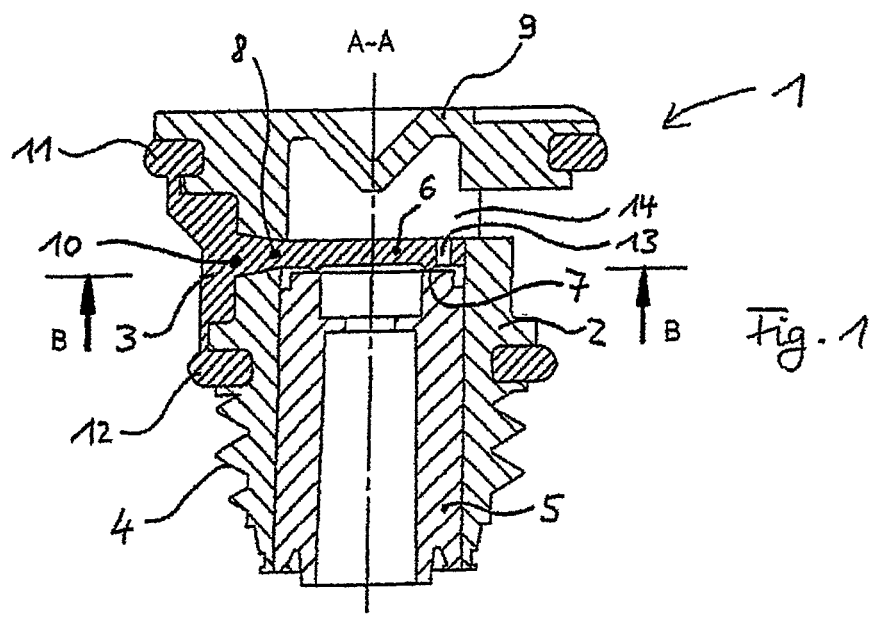
Figure 3:
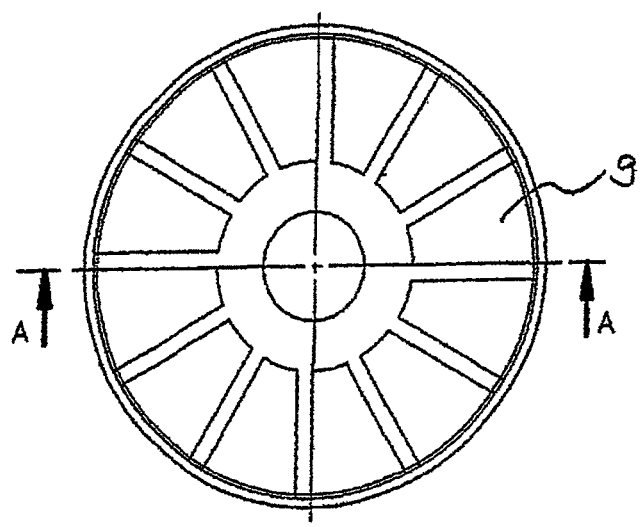
Figure 4:
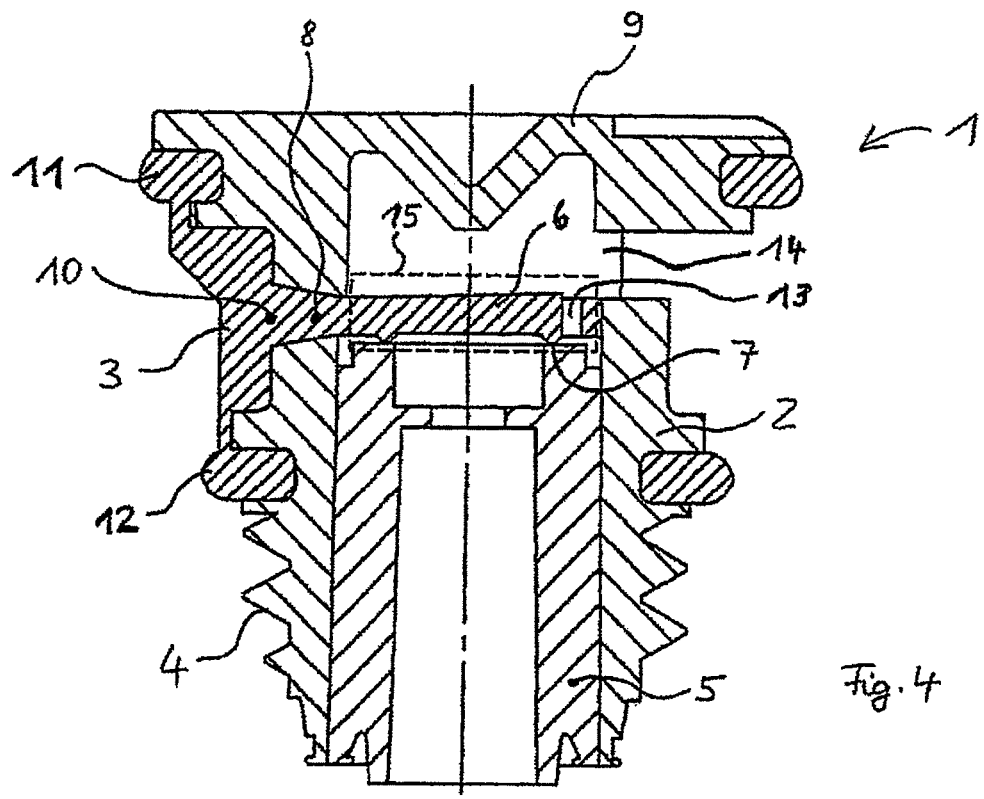

The invention will be explained in greater detail below with reference to an exemplary embodiment together with the appended drawings, in which:

FIG. 1—shows a cross-sectional view in the section A-A (FIG. 3) of a valve plug which is to be screwed into a double cover of a lead-acid battery;

FIG. 2—shows a plan view of a section B-B of the elastic valve element;

FIG. 3—shows a plan view of the valve plug from FIG. 1;

FIG. 4—shows a further embodiment of a valve plug; and

Figure 5:
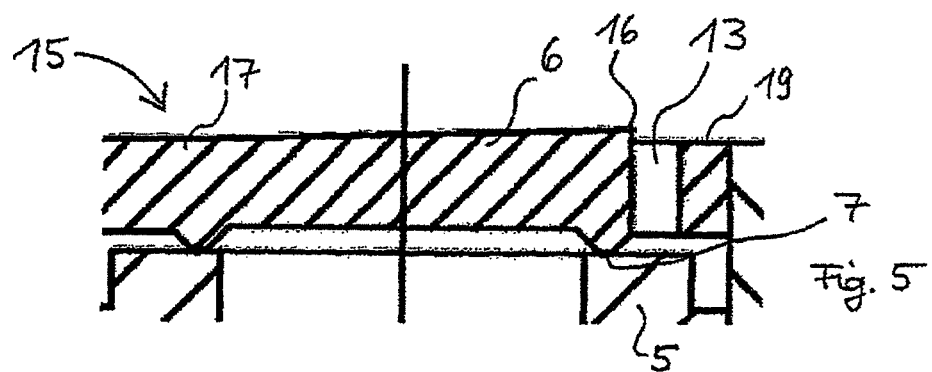
Figure 6:
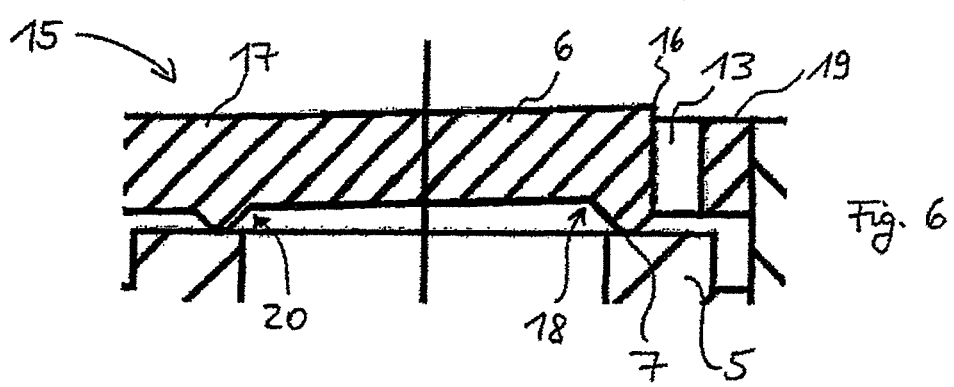

FIG. 5 shows a view of a detail of an embodiment of the sealing surface section; and FIG. 6—shows a view of a detail of a further embodiment of the sealing surface section.

In the figures, the same reference symbols are used for corresponding elements.

FIG. 1 shows a cross-sectional view of one embodiment of a valve plug 1 which is intended to be screwed into a double cover of a lead-acid battery. A double cover has, as is known per se, a lower cover which adjoins the cell compartment, a hollow space which is delimited by webs, and an upper cover which closes the cover at the top. The webs which extend between the lower and upper covers provide labyrinths through which a gas stream can be conveyed to a degassing opening and can be collected in the electrolyte and returned to the cells.

The illustrated section A-A is a cross section through the valve plug 1.

The valve plug 1 has a valve body 2 which is composed of a first, rigid plastics material, for example polypropylene PP. A valve element 3 which is composed of a second, elastic plastics material is integrally formed on the valve body 2. The second, elastic plastics material can be, for example, a rubber-elastic material. Fluoroelastomers, silicone rubber materials or other thermoelastic elastomers are suitable.

An external thread 4 is integrally formed on the valve body 2 in order to screw the valve plug 1 into a container opening. The valve plug 1 has a profiled cover part 9.

A plug part 5 is also inserted into the valve body 2, said plug part being introduced into the valve body 2 after molding of the valve body 2 and of the valve element 3 which is integrally connected to said valve body. The plug part 5 can be firmly connected to the valve body 2 in the lower region by welding or thermoplastic deformation. The valve plug 1 is produced by firstly molding the valve body 2 using the injection-molding process. The second, elastic material is then injected into the valve body 2 with the aid of a suitable mold in order to form the valve element 3. The valve element 3 essentially has a disk-like sealing surface section 6 which has a peripheral annular raised portion in the form of a sealing lip 7 on its side which faces the plug part 5.

The second, elastic plastics material is guided outward via an injection hole in order to form a first annular seal 11 at the upper periphery of the valve body 2 and, at a distance from said first annular seal and so as to adjoin the thread 4 from below, a second annular seal for the lower cover. The first annular seal 11 is provided for the upper cover.

The sealing surface section 6 which forms a valve is molded on as a flat plate in the interior of the plug together with the annular seals 11, 12, a holding section 10 and a connecting part 8 in one production process. The valve element 3 which is produced as a result is also connected, all the way around and in a gas-tight manner, to the wall of the valve body 2 of the plug. A peripheral sealing lip 7 is integrally formed on the lower face of the plate 6. Said sealing lip comes to rest on the plug part 5, which is inserted from below and serves as a valve holder, and the plug part 5 applies a preliminary pressure to said sealing lip, this preliminary pressure ensuring that the battery can be degassed but the valve closes at a minimum excess pressure before oxygen enters.

The valve function is influenced by a cutout 13 which is annular or in the form of a segment of a ring, is situated outside the sealing lip 7 and is in the form of a slot. The rigidity of the sealing surface section 6 is weakened by the slot 13 at this point, and therefore this part of the valve opens and closes at defined pressures. The slot 13 can have a different length depending on the required valve behavior. It is also feasible to divide the slot 13 using at least one web.

It is additionally possible to provide a supporting rib above the valve 6 for stabilization purposes. The material thickness of the valve 6 on the upper face in the region of the slot 13 can also be weakened by a step in order to more finely adjust the valve action. It is also possible to weaken the material thickness outside the sealing lip 7 by shaping from below for the purpose of improving the valve action.

The proposed type of valve 6 has the advantage that it is simple to produce. Existing types of plug can be adapted for production of the valve plug with little outlay.

As mentioned, at least one cutout 13 is provided in the sealing surface section 6, the sealing surface section 6 being open in the region of said cutout. On account of the cutout 13, the resilient region is made more flexible than in the surrounding region of the sealing surface section 6, and thus allows a defined valve function response in this region. A degassing channel 14 is provided in the valve plug 1 in the region of the cutout 13, said degassing channel adjoining a degassing channel in the double cover (not illustrated).

FIG. 2 shows a sectional view through the sealing surface section 6. It is clear that the sealing surface section 6 has a cutout 13 which is in the form of a segment of a ring. Other forms of the cutout 13 can also be advantageously employed.

The section B-B from FIG. 2 is illustrated in FIG. 1.

FIG. 3 shows a plan view of the valve plug 1 from FIG. 1. Section A-A of FIG. 1 is clearly shown in said FIG. 3.

FIG. 4 illustrates a further embodiment of the valve plug 1, in which a sealing surface section 6 which is arranged obliquely after insertion into the valve body is provided. The sealing surface section 6 which correspondingly runs in an oblique manner on its upper face is provided in the region 15 above the plug part 5, this region being emphasized by dashed lines. The region 15 is illustrated as an enlarged detail in FIGS. 5 and 6 using two exemplary embodiments of the sealing surface section 6.

FIG. 5 illustrates a sealing surface section 6 which has a material thickness which increases in an approximately linear manner, starting from the connecting part 8, in the direction of the cutout 13. As can be seen, the upper face of the sealing surface section 6 is situated at a higher level at point 16 than at point 17.

FIG. 6 illustrates a sealing surface section 6 which has a material thickness which is substantially constant. Instead, the height of the annular sealing lip 7 has a different size over its periphery. As can be seen, the sealing lip 7 is considerably larger in the region 18 in the vicinity of the cutout 13 than, for example, in the region 20. This also results in the surface of the sealing surface section 6 being at a higher level at the point 16 in comparison to at point 17.

The embodiments according to FIGS. 4 to 6 share the common feature than the sealing surface section 6 is under an increased prestress in the region of the cutout 13 and in the region of the point 16 compared to that surface of the valve plug 5 which is in contact with the sealing lip 7. In the state in which the sealing surface section is mounted in the valve plug 1, the increased prestress is reflected by the higher position of the upper face of the sealing surface section 6 at the point 16 in comparison to the level at the point 19. In the state in which the sealing surface section 6 is not mounted, said sealing surface section is relieved of stress. In this case, the point 16 is approximately level with the points 17 and 19.

In the valve plug according to the invention, degassing is performed as follows: when a corresponding excess pressure builds up inside the battery or the plug part 5, the sealing surface section 6 is subjected to a force, which is produced by the excess pressure, from below. The valve function of the sealing surface section 6 begins starting from a certain excess pressure, and therefore the sealing lip 7 lifts off slightly from the plug part 5 in the region of the cutout 13 and opens a gas flow channel. The gas which flows out can then be discharged through the cutout 13 and also the degassing channel 14.

The invention claimed is:

1. A valve plug for sealing off a container opening comprising: a valve body which can be fitted on the container opening and is composed of a first, rigid plastics material, and having a valve element which is integrally connected to the valve body and is composed of a second, elastic plastics material which is more elastic than the first plastics material, with the valve element having a sealing surface section, which can be fitted in a leak-tight manner on a bearing edge, and a connecting part which extends from the sealing surface section radially through an opening in the valve body to a holding section which is held on an outer periphery of the valve body, with the sealing surface section being held by the connecting part without axial support of the sealing surface section, wherein the sealing surface section has an annular sealing lip which points in the direction of a plug part, the height of the sealing lip varies annularly over the periphery of said sealing lip.

2. The valve plug of claim 1, wherein the sealing surface section has a cutout.

3. The valve plug of claim 2, wherein the cutout is in the form of a segment of a ring.

4. The valve plug of claim 1, wherein the holding section is integrally connected to at least one annular seal which is integrally formed on the outside of the valve body.

5. The valve plug of claim 1, wherein the valve plug is designed for use in a filling and monitoring opening in a rechargeable battery, in particular a lead-acid battery.

6. The valve plug of claim 2, wherein the sealing lip has the greatest height in the region of the cutout.

7. The valve plug of claim 1, wherein the material thickness of the sealing surface section is substantially constant, while the height of the sealing lip increases annularly from a portion of the sealing lip closest to the connecting part to a portion of the sealing lip closest to the valve body opposite the connecting part.

8. A valve plug for sealing off a container opening comprising: a valve body which can be fitted on the container opening and is composed of a first, rigid plastics material, and having a valve element which is integrally connected to the valve body and is composed of a second, elastic plastics material which is more elastic than the first plastics material, with the valve element having a sealing surface section, which can be fitted in a leak-tight manner on a bearing edge, and a connecting part which extends from the sealing surface section radially through an opening in the valve body to a holding section which is held on an outer periphery of the valve body, with the sealing surface section being held by the connecting part without axial support of the sealing surface section, and the sealing surface section having an increasing material thickness starting from the connecting part toward an edge of the sealing surface section opposite the connecting part.

9. The valve plug of claim 8, wherein the increasing material thickness of the sealing surface section extends from the connecting part toward a cutout provided in the sealing surface section.

10. The valve plug of claim 9, wherein the sealing surface section has the greatest material thickness in the region of the cutout.

11. The valve plug of claim 8, wherein the holding section is integrally connected to at least one annular seal which is integrally formed on the outside of the valve body.

12. The valve plug of claim 8, wherein the valve plug is designed for use in a filling and monitoring opening in a rechargeable battery, in particular a lead-acid battery.

13. The valve plug of claim 8, wherein the sealing surface section has an annular sealing lip which projects from the sealing surface section toward a plug part.

14. The valve plug of claim 8, wherein the material thickness of the sealing surface section increases in an approximately linear manner.

15. A valve plug for sealing off a container opening comprising: a valve body which can be fitted on the container opening and is composed of a first, rigid plastics material, and having a valve element which is integrally connected to the valve body and is composed of a second, elastic plastics material which is more elastic than the first plastics material, with the valve element having a sealing surface section, which can be fitted in a leak-tight manner on a bearing edge, and a connecting part which extends from the sealing surface section radially through an opening in the valve body to a holding section which is held on an outer periphery of the valve body, with the sealing surface section being held by the connecting part without axial support of the sealing surface section, the valve body defining an aperture for receiving a plug part, the sealing surface section extends from the connecting part to annularly couple to an inner wall of the valve body, overlapping the entirety of the aperture to form a leak-tight seal.

16. The valve plug of claim 15, wherein the sealing surface section has a cutout.

17. The valve plug of claim 16, wherein the cutout is in the form of a segment of a ring.

18. The valve plug of claim 15, wherein the sealing surface section has an annular sealing lip which projects from the sealing surface section toward the plug part.

19. The valve plug of claim 18, wherein the height of the sealing lip varies annularly over the periphery of said sealing lip.

20. The valve plug of claim 18, wherein the sealing surface section has an increasing material thickness starting from the connecting part to a cutout provided in the sealing surface section.

* * * * *